United States Patent [19]
Gold

[11] Patent Number: 5,023,450
[45] Date of Patent: Jun. 11, 1991

[54] METHOD FOR DISCRIMINATING MICROPHONIC NOISE IN PROPORTIONAL COUNTERS

[75] Inventor: Randy Gold, Houston, Tex.

[73] Assignee: Halliburton Logging Services, Inc., Houston, Tex.

[21] Appl. No.: 508,157

[22] Filed: Apr. 12, 1990

[51] Int. Cl.$^5$ .............................................. G01V 5/04
[52] U.S. Cl. .................................... 250/261; 250/265; 250/385.1; 250/389; 250/394
[58] Field of Search .................... 250/261, 265, 385.1, 250/394, 389, 374

[56] References Cited

U.S. PATENT DOCUMENTS 3,013,156 12/1961 Hearn .................................. 250/265

FOREIGN PATENT DOCUMENTS 55-162077 12/1980 Japan ................................ 250/385.1
60-172155 9/1985 Japan ................................ 250/385.1

Primary Examiner—Constantine Hannaher
Attorney, Agent, or Firm—William J. Beard

[57] ABSTRACT

This disclosure is directed to a detector system for use in measuring while drilling (MWD) equipment. It comprises preferably duplicate chambers positioned to one another and mounted in a MWD system where they are subject to the same shock and vibration. The shock and vibration impinge on the two chambers, and cause two output signals to be formed. The two output signals are applied to a differential amplifier so that the microphonic portion of the signal is cancelled. This then leads to a differential output signal which carries in it the signals representing nuclear events detected by the similar or duplicate detector means. Alternately, a single chamber can be used if it is provided with two anode wires and they are connected to the differential amplifier for signal cancellation.

12 Claims, 1 Drawing Sheet

U.S. Patent
June 11, 1991
5,023,450
FIG.1
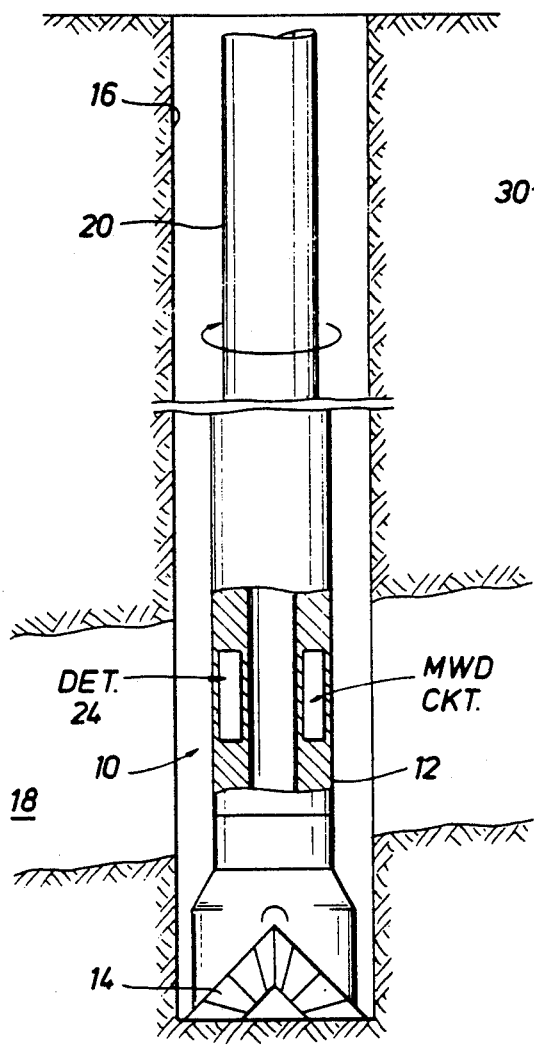
FIG.2
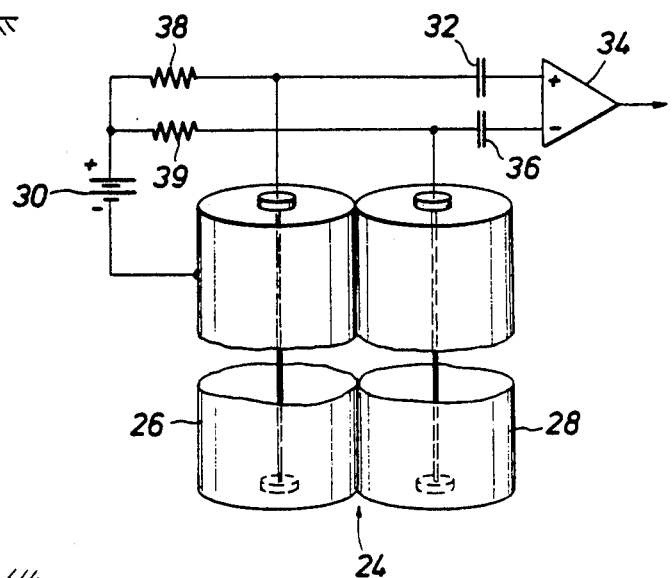
FIG.3
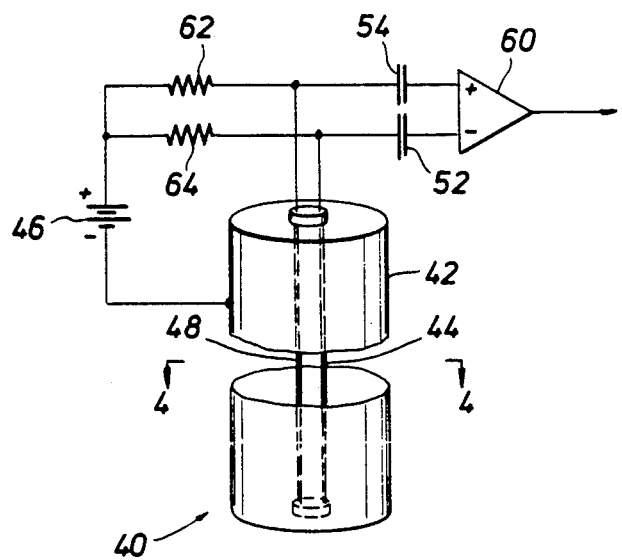
FIG.4

METHOD FOR DISCRIMINATING MICROPHONIC NOISE IN PROPORTIONAL COUNTERS

BACKGROUND OF THE DISCLOSURE

The present disclosure is directed to an improved detector and especially one which can be used in measuring while drilling (MWD) apparatus. It also can be used in wireline supported logging devices. As a generalization, the present disclosure is directed to an improved detector which has improved capability for distinguishing randomly occurring nuclear events from events which are primarily resultant from vibrations of the equipment. In particular, with the advent of thermal neutron porosity tools which are typically now mounted in MWD equipment, thermal neutron detectors are placed in the drill collars. One type of thermal neutron detector is a chamber which is filled with a gas sensitive to the transient neutrons passing through the container. For instance, one typical detector system utilizes a chamber filled with $^3$He. This gas filled detector has a known thermal neutron absorption cross section. This type detector will respond to the randomly occurring neutron events, but it will also regrettably respond to environmentally created vibrations or shocks inherent in use of the equipment.

Particularly in a MWD system, the equipment is normally mounted in a thick walled pipe which is otherwise known as a drill collar. The drill collar is normally included in the drill stem just above the drill bit and below the drill pipe to add weight for the drill bit and to also provide a stiffer pipe to assure that the well remains true without drift. The stiffness of the pipe in this circumstance is engendered in part by the thick wall construction. The MWD equipment including the appropriate circuitry and the detectors are placed in recesses in the thick wall. When so mounted, the MWD equipment is immediately adjacent to the drill bit so that it can make measurements of the formations as they are penetrated by the drill bit. However, positioning of this structure and mounting of the MWD circuitry and detector in a drill collar which is threaded to the drill bit subjects the detector to substantial shock impact. As a generalization, the shock occurring at the lower end of a drill stem is quite severe. While the drill bit remains on the bottom during rotation, it nevertheless is impacted with a constant vibration dependent on the number of teeth in the cones making the drill bit and the speed of rotation. This establishes a fundamental frequency vibration with harmonics or overtones which are felt or sensed in the drill stem and particularly at the MWD equipment. Separate from all of this there are, however, random occurring events which provide vibrational shock to the drill bit which shock is coupled into the MWD equipment. While some of this shock may be repetitive, it is also mixed with randomly occurring vibrational shock to the MWD equipment. While shock is worse with MWD equipment because it is near the drill bit which bears against the lower end of the well, there is a similar risk of vibration in a wireline tool. Typically, a wireline tool is lowered as fast as possible into a well borehole until it arrives at the bottom. It is then retrieved at a fixed speed along the well. Data is normally collected during retrieval of the wireline supported tool. In this instance, there again is the risk of vibration by bumping and banging of the tool as it is raised in the well borehole. This banging is manifest by forming vibrational forces in the wireline supported tool which impinge on the thermal neutron detector.

Detectors are normally intended to form an output signal when a thermal neutron traverses the detector. However, the vibration forces described above are quite substantial and may indeed create spurious output signals. Indeed, the instantaneous shock or impact loading which occurs in a wireline supported tool can generate shock waves of a few g's. In a MWD tool, the vibrational forces can be larger, perhaps ten, twenty or even thirty g's. When this occurs, the detectors normally form an unwanted output which is spurious. Not only is it spurious, it is of such large amplitude that it may well obscure thermal neutron events which should have been captured and recorded. This kind of shock originated output noise signal is described as microphonics. The present disclosure sets forth a method and apparatus for reducing or eliminating the microphonics so that the neutron originated events are observed and can be recorded.

Current techniques for reducing microphonics focus primarily on improved mounting for the detectors such as shock absorbers and the like. Alternately, electronic filtering of the microphonic signals is effective. It is submitted that the method and apparatus of this disclosure reduces microphonics markedly.

The present disclosure particularly sets forth a system for MWD construction where two detector are incorporated. The two detectors are mounted in close proximity (e.g., side by side) so that they are, exposed to the same vibrational forces. The output signals are provided to a differential amplifier which subtracts one from the other. The vibration induced noise signal occurs commonly in time in both detectors whereas the nuclear events are random. Using principally the common mode rejection obtained from differentially coupling these signals, the vibrationally induced signal is cancelled. Depending on the frequency of the nuclear events and other system factors, the microphonic signals from the two detectors are differentially cancelled with only a small portion of the data lost. In other words, the differential output signal has the neutron components minimally reduced while the component attributable to the microphonics is eliminated, ideally only leaving the neutron signals.

In this configuration, differential cancellation of the microphonic noise is substantially accomplished. This assumes that the two detectors are equal in all regards. It is possible, however, to fill one of the two detectors with the $^3$He gas in the conventional fashion, and to fill the other detector with a gas which has a markedly reduced neutron absorption cross section, wherein that detector has its neutron sensitivity substantially reduced to zero, or nearly so. This detector would in that instance only generate a microphonic response signal which, on being scaled in the proper fashion, could then be used as a differential offset to the signal from the other of the two detectors. The foregoing is directed to a two detector system. An alternate embodiment of the present disclosure utilizes similar and adjacent anode wires in a single detector chamber. The two conductors or wires in the central portion of the system move together, meaning they respond in similar fashion to the shock loading and therefore the two output signals are provided to a differential amplifier. When a nuclear event then occurs, the output typically is found at only one of the two anode wires and the intended output is substantially not impacted by the incorporation of the differential amplifier in the two anode wire system just mentioned. In another embodiment, the two wires are mechanically joined to assure common motion. For instance, the wires are joined by an insulator such as an epoxy resin bridge.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 shows an MWD tool in a well borehole connected just above a drill bit and thereby subjected to substantial vibration showing a representative place of installing a detector in the associated MWD circuitry in a drill collar just above the drill bit and subject to vibrations in that region;

FIG. 2 is a schematic diagram of a pair of detector chambers which provide output signals to a differential amplifier to reduce or cancel the microphonic constituent of the output signals;

FIG. 3 is an alternate embodiment showing a two anode system in a detector chamber; and FIG. 4 is a sectional view along the line 4—4 of FIG. 3 showing details of construction of a dual wire system forming two anodes in the detection chamber of FIG. 3.

BRIEF DESCRIPTION OF THE PREFERRED EMBODIMENTS

Attention is directed to FIG. 1 of the drawings where a MWD system 10 is shown mounted in a drill collar 12 and is threaded to a drill bit 14 for drilling a well borehole 16. At this stage of proceedings, the well is uncased to enable the drill bit to rotate as the drill stem is advanced into the borehole. Drill collars are included just above the drill bit to provide weight and stiffening to the drill stem. The several drill collars in the aggregate guide the drill bit so that the well is true. The well passes through several formations including the formation 18. The MWD system 10 will detect some variable of the formation 18 which will be exemplified hereinafter. The drill stem incorporates the drill pipe 20 which extends along the borehole 16 to the surface where it is rotated by a rotary drilling rig. As the well advances, the MWD system detects and measures data of importance to the drilling process. In this particular instance, it is appropriate to assume that the MWD system includes a thermal neutron formation porosity measuring system. To this end, the formation 18 has a specific porosity which is measured by operation of MWD system 10. The MWD system 10 incorporates appropriate circuitry which is connected with a detector 24.

The detector and the circuitry which make up the MWD system 10 are mounted in the sidewall of the relatively thick wall structure which is the drill collar. The sidewall has appropriate recesses formed in it to receive the circuitry also. However, the present disclosure focuses primarily on the detector indicated at 24. This responds to thermal neutrons from the immediate vicinity and provides output data which, when appropriately analyzed, is able to provide an indication of porosity of the formation 18.

The detector 24 is subjected to substantial shock and vibration when mounted in the sidewall as illustrated. Here, it is shown mounted in a relatively large diameter, cylindrical drill collar. In this instance, the drill collar happens to be hollow to permit fluid flow along the drill stem. It is, however, threaded directly to the drill bit at the lower end so that the drill bit imparts shock vibration and movement in the rugged enviroment. The shocks which are experienced by the MWD equipment can easily approach ten, twenty or thirty g's of shock loading. When this occurs, microphonic noise may be created and will obscure the thermal neutron data which is otherwise intended to be obtained from the detector 24. As will be understood, the MWD equipment may include other types of measuring devices including those devices which measure the angular position of the well or other perameters regarding operation. The present disclosure is concerned primarily with the microphonic shock loading which impinges on the nuclear detectors described herein.

Attention is now directed to FIG. 2 of the drawings which shows a portion of the MWD mounted equipment used for detection of neutrons. In particular, FIG. 2 shows first detectors 26 and 28. The detectors 26 and 28 are preferably identical in size and shape. They are preferably identical in operation in all regards. The detectors 26 and 28 make up the detector system 24 shown in FIG. 1. They are ideally positioned in the sidewall of the drill collar and are exposed to detect neutrons. A power supply 30 provides electrical power for the detectors, and the output of the power supply is connected at the positive terminal with the detector 28. The detector 26 is constructed in similar fashion. The two detectors are both provided with an appropriate ground connection and they are mounted in the MWD supportive drill collar for exposure to common shock. In this regard, the detectors 26 and 28 are mounted in identical fashion. That is, the same shock is experienced by each of the two detectors.

The detector 28 is connected with a suitable blocking capacitor 32 to the negative input of a differential amplifier 34. The positive input terminal is connected with a suitable DC blocking capacitor 36. It is connected from the detector 26. The resistors 38 and 39 provide high impedance to the anode signal to prevent shunting of the signals to the power supply which otherwise has a low impedance. The two detectors, being preferably identical in size and shape and being subjected to the same vibration, provide similar vibration related outputs. In other words, they provide similar microphonic output singals.

The two detectors provide output signals to the differential amplifier which are cancelled in the operation of the amplifier. To this end, both form similar outputs in response to similar shock loading. Assume for purposes of example that a shock impulse is imparted during operation of MWD equipment, and assume that the shock impulse involves 30 g's of impact loading. In that instance, the detectors 26 and 28 form similar outputs. The two output peaks of the two detectors are dynamically coupled through the blocking capacitors 32 and 36 and are input to the differential amplifier 34. They drive respective signals in equal and opposite directions to thereby cancel and provide a negligible output from the amplifier 34. By contrast, neutron flux impingement on the detector system forms a random output signal exhibiting negligible differential cancellation. It is possible that some portion of the signal will be lost, that is, some portion of the desirable signal. In that instance, one of the chambers 26 or 28 can be filled with $^3$He while the other is filled either with less gas or alternately with a gas which has a reduced sigma referring to its thermal neutron absorption cross section. In other words, the nuclear detection sensitivity of one of the two chambers can be reduced while retaining the microphonic response.

Both output signals are useful because they involve radiation impinging on the detectors through different paths. Accordingly, the two detectors can have precisely equal outputs and be equal in sensitivity. They are ideally mounted so that they are exposed to equal levels of shock, and thereby form equal output microphonic noise signals. However, it is possible to create a bias which reduces the neutron sensitivity of one of the detectors while the output response to vibration remains approximately equal between the two. In the event that it is appropriate, preamplifiers and other signal conditioning can be imposed for both of the signals to the amplifier 34 and they can be relatively adjusted to vary the input signals. In summary, the differential amplifier is used to null the microphonic signal substantially to zero while the portion of the signal derived from the nuclear events is amplified and is applied to additional circuitry for subsequent analysis.

Attention is now directed to FIG. 3 of the drawings. This sets forth a modified detector system identified at 40. This detector system shows a chamber 42 having a conventional anode wire 44 positioned in the chamber. The wire is connected with a DC high voltage supply 46 in the ordinary fashion. In addition to that, there is a second anode wire 48 which is similarly installed and the two wires are separated by a few millimeters. They are supported in the chamber to operate in the well known fashion. However, the difference primarily derives from the fact that there are two such anode wires 44 and 48. The two wires are close to one another and may be joined by a thin web 50 between the two of them. The web material 50 is incorporated so that the two wires move together or move jointly. The two wires are electrically insulated from one another. The wires 44 and 48 respectively connect to outputs through coupling capacitors 52 and 54 respectively and are input to a differential amplifier 60. The two wires are connected through the resistors 62 and 64 to the high voltage power supply to assure that the impedance looking toward the power supply is not so low that output signal is shunted away from the amplifier 60. The two conductors thus provide output signals which are then added, and with the polarity reversal taken into account, microphonic signals can ideally be cancelled. In this arrangement, one of the anode wires operates as a vibration detector. An alternate form of detector can be used so long as it responds to the shock stimuli. If the two anodes do not form equal amplitude signals, they can both be input to amplifiers to enable preliminary amplification so that a common shock is manifest by equal amplitude signals.

The two anode wires are joined together by the webbing. The webbing 50 is preferably an insulative material such as plastic. This plastic material assures that shock imparted to one of the two wires is experienced by the other. The two anodes respond in similar fashion to shock loading. When a shock event occurs, the two anode wires 44 and 48 output equal and opposite signals which cancel at the differential amplifier 60. This reduces the microphonic output signal to zero or substantially near zero. The output signal of interest which derives from the neutron events is not equally reduced. The webbing 50 can be omitted in some instances.

The foregoing illustrated embodiments of FIGS. 2 and 3 are installed in the MWD equipment shown in FIG. 1, or alternately, they can be installed in a logging tool supported on a wireline cable in the well borehole.

While the foregoing is directed to the preferred embodiment, the scope thereof is determined by the claims which follow.

What is claimed is:

1. A detector system responsive to nuclear events for installation in a downhole logging tool including measuring well drilling equipment which subjects the detection system to microphonic shock, the detector system which comprising:
   (a) a closed chamber subject to impinging nuclear events and having two separate anode wires therein spaced apart from each other and spanning said chamber, providing a pair of separated spaced output terminals to thereby form an output signal;
   (b) circuit means connecting from at least one of said chamber output terminals to a different amplifier means having two input terminals;
   (c) said circuit means connected from said output terminal of said chamber to one of the input terminals of said differential amplifier means to cause formation of an output signal from said differential amplifier means; and
   (d) vibration shock responsive means mounted in said detector system and having an output terminal which forms an output signal for connection to a second input at said differential circuit means so that microphonic signals from said chamber and said shock responsive means are provided thereto and tend to cancel when applied to the input terminals thereof, and wherein said shock responsive means does not cancel at said differential circuit means signals relating to nuclear events from said detector system.

2. The apparatus of claim 1 wherein said detector system includes a second chamber which is similar to said chamber and said closed second chamber also forms an output signal.

3. The apparatus of claim 2 wherein said detector system comprises a similar separately mounted chamber, and said two chambers are gas filled and have output terminals for formation of output signals resultant from nuclear events.

4. The structure of claim 3 wherein each of the two chambers is provided with identical gases.

5. The apparatus of claim 3 wherein said chambers are provided with different gases.

6. The apparatus of claim 3 wherein said chambers are mounted adjacent one another in a drill collar at a recess within the sidewall thereof.

7. The apparatus of claim 1 wherein said chamber is provided with a pair of spaced parallel anode wires, and said anode wires are joined by connective means extending therebetween wherein said connective means assures that shock or vibration imparted to one of said wires is also imparted to the other of said wires.

8. The apparatus of claim 7 wherein said vibration shock responsive means comprises one of said anode wires.

9. The apparatus of claim 8 wherein said anode wires are connected to a voltage source providing an operating voltage thereto.

10. The apparatus of claim 9 wherein said circuit means comprises first and second DC blocking capacitors connected to said anode wires.

11. The apparatus of claim 10 wherein said circuit means connects to two input terminals of said differential amplifier means to formation of differential output relating to nuclear events detected by the detector system.

12. The apparatus of claim 1 including a pair of similar chambers having similar size and shape and wherein said chambers are filled with $^3$He.

* * * * *